Feb. 2, 1954 W. W. MILLER 2,667,812
TIMING LIGHT CONTROL FOR OSCILLOGRAPHS AND THE LIKE
Filed June 9, 1950 2 Sheets-Sheet 1
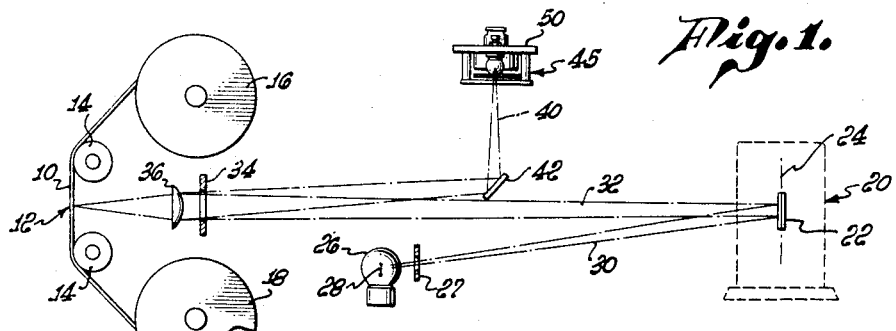
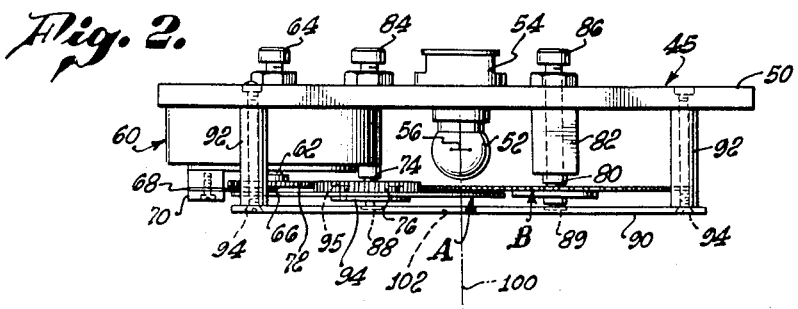
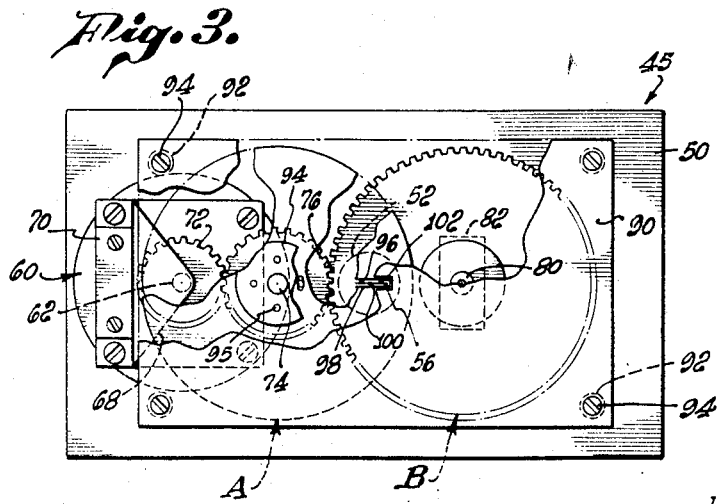
INVENTOR.
WILLIAM W. MILLER,
BY
*Bakelew & Hawkesbury*
ATTORNEYS.

Feb. 2, 1954 — W. W. MILLER — 2,667,812
TIMING LIGHT CONTROL FOR OSCILLOGRAPHS AND THE LIKE
Filed June 9, 1950 — 2 Sheets-Sheet 2
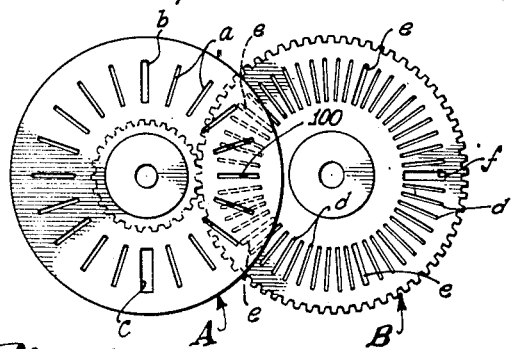
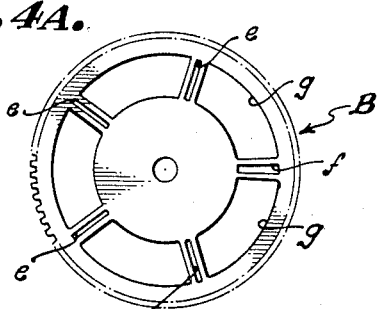
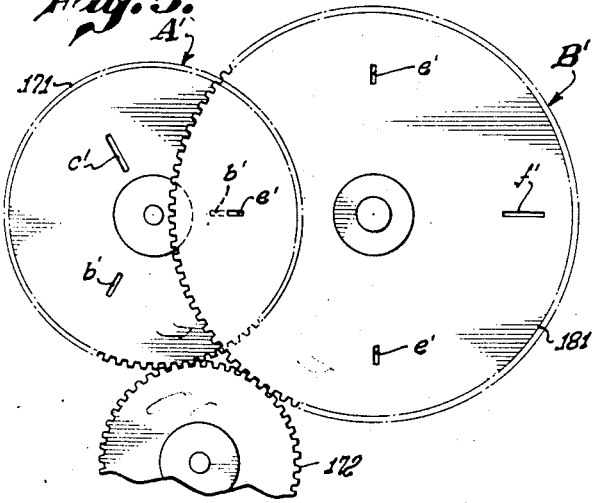
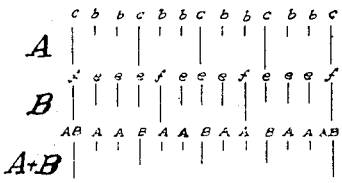
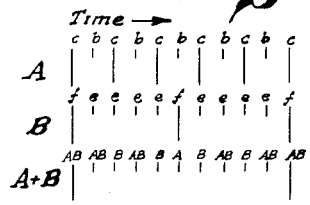
INVENTOR.
WILLIAM W. MILLER,
BY
Barkelew & Saudlebury
ATTORNEYS.

Patented Feb. 2, 1954

2,667,812

UNITED STATES PATENT OFFICE 2,667,812

TIMING LIGHT CONTROL FOR OSCILLOGRAPHS AND THE LIKE

William W. Miller, Los Angeles, Calif., assignor, by mesne assignments, to William Miller Instruments, Inc., a corporation of California Application June 9, 1950, Serial No. 167,218

4 Claims. (Cl. 88—61)

This invention relates generally to the production of series of light flashes for which the effective intensity of successive flashes varies in accordance with a predetermined, periodically repeated sequence.

Such ordered sequences of light flashes are useful, for example, in connection with such instruments as photographic oscillographs, which record the time course of various phenomena on moving strips of photographic material. It is a usual practice in such instruments to provide a timing light system which periodically projects a transverse line image onto the moving record strip, to produce in the finished photographic record a longitudinally spaced series of lines corresponding to a definite series of time intervals. A light beam suitably focused to form a sharp transverse line on the record strip, may, for example, be intercepted by a shutter which is operated intermittently to produce suitably timed light flashes.

To facilitate reading the resulting time lines in the developed record, it is convenient to provide lines of different widths, lengths or intensities to denote various different time intervals. As a typical example, it is desirable on many types of records to provide relatively fine lines at intervals of 0.01 sec., every tenth line being relatively heavy to denote tenths of seconds, and every tenth one of those lines still heavier to denote seconds. A schedule of timing lines of that general type can be produced, for example, by interrupting the light beam with a rotating shutter disk carrying 100 radial slots or similar light apertures of suitably distributed sizes, uniformly spaced circumferentially of the disk.

However, the production of a timing sequence of the type indicated by means of a single shutter disk involves serious difficulties. Since each of the light flashes must be sharply defined in time, the angular width of each aperture, and particularly of the narrowest apertures, must be relatively narrow compared to the angular separation of adjacent apertures. Also, the cross section of the light beam at the shutter disk must not be appreciably wider than the narrowest shutter apertures. To fulfill such requirements, and at the same time to provide in the beam adequate light flux to give good exposure of the record strip at all required recording speeds, it has been necessary in previous practice either to provide a shutter disk of unreasonably large diameter or to provide a relatively elaborate and expensive optical system.

The present invention provides sequences of timing flashes of the required type without the need of complex optical equipment and with shutter parts of convenient and economical dimensions. The improved means for controlling the light beam employs two or more shutters which are operated in accordance with distinct but closely coordinated timing sequences. It has been discovered that two or more relatively simple shutter timing sequences, each requiring a shutter of relatively simple and compact construction, can be combined in such a way as to yield a relatively complex overall timing sequence of the required type. The exact character of the resulting overall timing sequence can be varied within wide limits to meet specific requirements by appropriate selection and combination of the timing sequences of the component shutters.

A clear understanding of the invention and its further objects and advantages will be had from the following description of an illustrative embodiment, of which the accompanying drawings comprise a part. The individual shutters may be of any type, so long as they are conveniently operable intermittently and in suitable mutual relation. In practice it is convenient, but not necessary, to employ shutters of rotating disk type. Whereas the present description is particularly directed to that type of shutter, it is to be understood that the particular embodiments herein described are illustrative of the invention, but are not to be construed as limiting its scope.

In the drawings:

Fig. 1 is an elevation, partly schematic, illustrating a preferred embodiment of the invention in an oscillograph;

Fig. 1A is a schematic plan of the recording optical system of Fig. 1;

Fig. 2 is a side elevation of the illustrative timing light control unit of Fig. 1, at enlarged scale;

Fig. 3 is an inverted plan, partly cut away, corresponding to Fig. 2 and showing only one aperture in each shutter for clarity of illustration;

Fig. 4 is a partly schematic inverted plan of typical shutter disks in accordance with the invention;

Fig. 4a corresponds to a portion of Fig. 4 and shows a modification;

Fig. 5 corresponds to Fig. 4, but shows a further modification;

Figs. 6–8 are schematic diagrams, illustrating typical timing mark sequences and their production in general accordance with Fig. 4; and Figs. 9–11 are corresponding diagrams in general accordance with Fig. 5.

Fig. 1 illustrates schematically a typical environment in which the present invention is useful. A strip of photographic record material, such, for example, as photo-sensitized paper, indicated at 10, is movable longitudinally past a recording station 12, at which the plane of the strip is determined accurately by any suitable guide means, shown illustratively as guide rolls 14. The strip is typically moved past station 12 at a uniform and preferably adjustable record speed from a supply roll 16 to a take-up roll 18 by any suitable power means, not shown.

The numeral 20 represents an instrument responsive to the variable quantity that is to be recorded. That instrument typically includes a mirror, indicated at 22, rotatable about an axis 24 in response to the said variable quantity. A light source, shown as a lamp 26 with filament 28, may be provided for projecting a light beam upon mirror 22. The reflected beam 32 then swings about axis 24 in response to rotational movement of the mirror. As illustrated, the swinging movement of reflected beam 32 is in a plane perpendicular to the plane of Fig. 1 and transverse of record strip 10 at recording station 12. Recording light beam 32 then produces on moving record strip 10 a continuous record of the movements of mirror 22. The resulting record is in the form of a graph, with mirror movement plotted transversely of the record strip and time plotted longitudinally.

Recording light beam 32 is preferably focused to a sharp image at recording station 12. A particularly effective optical system for forming such an image is shown in Figs. 1 and 1A. In that illustrative system, the filament of lamp 26 is of substantially straight line form, as indicated at 28, having a relatively small width (in the plane of the paper in Fig. 1A), and having its longer dimension (in the plane of the paper in Fig. 1) effectively defined by a suitable diaphragm 27. A cylindrical lens 36 of relatively short focal length is placed relatively close to record strip 10 with its cylindrical axis transverse of the strip in such position that record strip 10 and diaphragm 27, as imaged in mirror 22, lie in conjugate focal planes of the lens. The effective aperture of lens 36 may be limited by a diaphragm 34, which, like the lens, extends across the entire usable width of record strip 10. Mirror 22 is cylindrically concave, having its cylindrical axis of rotation 24 and to the length of record strip 10, and having such curvature that lamp filament 28 and record strip 10 lie in conjugate focal planes of the mirror.

The resulting recording image formed by light beam 32 at recording station 12 is then of generally rectangular form. Its dimension in a direction transverse of record strip 10 is determined by the width of filament 28, slightly magnified by mirror 22 (in the particular arrangement shown), since the focal distance of the filament with respect to the mirror is somewhat less than that of its one-dimensional image at the record strip. The dimension of that image longitudinally of the strip is determined by the length of filament 28, or its effective length as limited by diaphragm 27, very considerably reduced optically by lens 36. The ratio of that reduction is the ratio of the focal distance between lens 36 and record strip 10 to the conjugated focal distance between the lens and diaphragm 27. That ratio can conveniently be made quite small, more than compensating for the relatively small width of filament 28. In preferred practice, the resulting recording image is considerably smaller longitudinally of the record strip than transversely. An important advantage of that relationship is its tendency to equalize the degree of exposure of the resulting record line on strip 10 during the relatively slow movement of the beam image longitudinally of the record strip (due to uniform travel of the strip) and the relatively rapid excursions that typically occur transversely of the strip (due to rapid changes in the value of the quantity being recorded). That equalization results from the fact that the beam image is relatively elongated in the direction of its most rapid travel.

A timing light beam is preferably projected simultaneously with recording light beam 32 onto record strip 10 at (or very close to) recording station 12. That is conveniently, although not necessarily, accomplished by utilizing cylindrical lens 36, and by providing a fixed mirror as indicated at 42 to direct the timing light beam from a suitable source toward lens 36 along an axis that substantially coincides with that of recording beam 32. It is generally preferable to focus timing light beam 40 only longitudinally of record strip 10, allowing the beam to spread transversely of the record strip to form a line extending across part or all of the width of the strip. That may readily be accomplished, for example, by a cylindrical lens such as 36, slit 34 being elongated in a direction transverse of the strip.

The present invention is concerned more particularly with improved means for producing an intermittently flashing light beam, such as may be utilized as a timing light beam in apparatus of the type just described, or in any other apparatus or device in which such a flashing light may be useful. A typical embodiment of the improved light control means is represented at 45 in Fig. 1, and is shown in typical detail in Figs. 2–4.

In Figs 2 and 3, a supporting frame member is shown at 50 in the form of a rectangular mounting plate upon which the entire light source and control means are preferably mounted as a self-contained unit. Plate 50 may be mounted in suitable position with relation to other parts of the apparatus of Fig. 1 in any convenient manner. The orientation of plate 50, and hence of the entire light control unit, with respect to the rest of the apparatus may be varied in accordance with specific requirements, light beam 40 being projected to recording station 12 by any suitable optical means. For the sake of clarity, the preferred horizontal orientation of plate 50 will be adopted here as a basis for description, but without implying any limitation upon the scope of the invention.

As will appear, the unit 45 is preferably, although not necessarily, adapted to project a beam of elongated cross-section; and the optical system is then such as to throw that beam on slit 34 and lens 36 with its cross-sectional length parallel to the slit and the axis of lens 36. (In Fig. 1, the unit 45 is viewed endwise—as from the right in Fig. 2.) The single mirror 42 and lens 36 shown in Fig. 1 are intended to represent any suitable optical system for projection and utilization of the intermittent light beam.

In the preferred modification illustrated, an incandescent lamp 52 is mounted in a suitable socket 54 on plate 50. To facilitate quick change of the lamp, socket 54 is preferably of prefocus type, mounted in some readily releasable manner on the upper face of frame plate 50, with lamp 52 projecting downward through a clearance aperture in the plate. Lamp 52 is preferably of the line filament type having its filament 56 parallel to the longitudinal axis of plate 50, as indicated in Fig. 3.

A constant speed motor, shown as synchronous alternating current motor 60, is mounted on the under side of plate 50. The main motor shaft is shown at 62, journaled in the motor frame between an upper thrust bearing, adjustable by screw 64, and a lower thrust bearing 66 that takes the weight of the rotor and is supported on the motor frame by means of leaf 68 and bracket 70. Motor shaft 62 carries a spur gear 72.

A first shutter shaft 74 is journaled in the motor frame near its periphery, and carries a gear 76 in mesh with motor gear 72. A second shutter shaft 80 is journaled parallel to shaft 74 in a journal block 82 mounted directly on plate 50. The upper thrust bearings of shutter shafts 74 and 80 are adjustable, as illustrated, by the screws 84 and 86, respectively, and their lower thrust bearings comprise flat disks 88 and 89 of appropriate material mounted in suitably located recesses in a bearing plate 90. That plate is provided with a window 102 and is mounted on frame plate 50 as by posts 92 and screws 94. Since bearings 88 and 89 are flat thrust bearings, their positions in the plane of the bearing plate is not critical, and only their spacing from frame plate 50 need be maintained accurately. With the preferred structure illustrated, shutter shafts 74 and 80 and their carried shutters are readily demountable by removal of bearing plate 90.

A first shutter A, illustrated as a circular disk, is rigidly mounted on shaft 74, preferably in such a manner as to be rotatably adjustable relative to gear 76 through an angle that is at least as great as the angular spacing of adjacent gear teeth. Such adjustment may be provided, for example, by employing gear 76 as a hub or mounting disk for the shutter, and clamping the latter between that hub and a mounting plate 94 by screws 95, the screw holes in the shutter (or in the gear) being suitably slotted. Shutter A is thus driven by motor 60 through the gear train 72, 76, which may be considered to represent any suitable driving means for the shutter. Gears 72, 76 may be selected to provide any required speed ratio. For example, in the particular embodiment here illustrated, they provide a speed reduction of 6:5. Hence, if motor 60 is designed to operate at 6 revolutions per second on 60 cycle alternating current, shutter A is driven at 5 R. P. S. If no such modification of speed is required, and if motor 60 is of suitable shape, shutter A may be mounted directly on the motor shaft, rather than on an auxiliary shaft as illustrated.

A second shutter B, here comprising a second disk, is mounted on shaft 80 in axial spaced relation to shutter A, and is driven in definite timed relation to shutter A. A preferred means for so driving shutter B is illustrated, and comprises gear teeth cut directly in the periphery of the circular shutter disk B and engaging gear 76, through which disk A is driven. While that arrangement provides a convenient and economical structure, it will be understood that many other types of driving connection may also be used, permitting the shutters to be mounted coaxially if that is preferred. The relative speeds at which the two shutter disks are driven are selected in accordance with the required overall periodic sequence of light flashes and the separate component sequences of the two shutters by which that overall sequence is to be obtained.

In the present illustrative embodiment shutter A rotates 2½ times faster than shutter B, so that the speed of shutter B is 2 R. P. S.

As shown best in Fig. 3, the two shutters overlap directly below lamp 52, so that light from the lamp is transmitted directly downward along vertical beam axis 100 through window 102 in plate 90 only if apertures in the two shutters coincide at that axis. Lamp filament 56, as shown, lies in the plane defined by shutter shafts 74 and 80. That has the advantage that a radial slot in either of the shutter disks passes below the filament in accurate alignment with the filament axis. In Fig. 3 a typical slot 96 in shutter B and a wider slot 98 in shutter A are shown in such alignment with filament 56, in position to transmit light from the filament along beam axis 100 (Fig. 2) through the window 102. That window is preferably large enough that it is not an effective stop in the optical system. If the shutters are so timed that two such slots are so aligned as they cross the beam axis (as is readily accomplished in the present embodiment by adjustment of disk A relative to gear 76), light is transmitted parallel to that axis from the entire length of the filament. The duration of actual or potential light transmission by a shutter slot depends upon the ratio of the slot width to its speed of travel, which quantities may be measured either both linearly or both angularly. Practical control of an actual light flash is in general exercised by whichever one of two such coinciding slots would by itself yield a shorter flash. Although the slots may be formed with side edges that are strictly radial with respect to the shutter axis, it is more convenient in practice, and fully effective in result, to form the slots with parallel edges, as shown in the drawings.

The total effective light flux transmitted in any one flash depends both on the duration of light transmission parallel to the beam axis and, for example, upon the solid angle of the actual beam that can be transmitted by the shutter and received by the rest of the optical system. That solid angle may depend upon various constants of the optical system, including, for example, the axial separation of filament 56 from the planes of the respective shutter disks and the aperture and axial position of cylindrical lens 36 or its effective aperture stop, here represented at 34 (Fig. 1). When such factors are taken into account, it is found in general that the total light flux transmitted by the overall system during a given flash depends somewhat upon the size and speed of travel of the slots in both shutter disks, even though the duration of light transmission parallel to beam axis 100 is determined by one slot to the substantial exclusion of the other. For clarity of explanation, the present description will be largely confined to the relatively narrow beam of light emitted from the filament directly downward parallel to the beam axis. That parallel beam is of ribbon form, having a cross-section determined, in the present instance directly by the dimensions of filament 56. As shown here, the shutter slits are longer than the filament; if they are shorter (Fig. 5) their length will determine the length of the cross-sectional area of the beam. Considering that the thickness of the filament is very small, the total light flux in that limited beam in a transmitted flash depends substantially entirely upon the flash duration, which is readily computed from the geometry and speed of rotation of the shutter disks. The modifying effect that other factors of the optical system may have in any specific instance can then be estimated or calculated to any degree of precision that is required.

An illustrative preferred arrangement of slots in shutters A and B is shown in Fig. 4. In that arrangement the angular spacings of the slots on the two shutters is directly proportional to the speeds of rotation of the respective shutters. Hence, with suitable relative angular adjustment of the two shutters, whenever a slot of one shutter crosses beam axis 100, a slot of the other shutter simultaneously crosses that axis. With the slot pattern shown in Fig. 4 and the typical speeds mentioned above, a light flash is transmitted every 1/100 second.

If all slots on each shutter had the same effective size and were uniformly spaced, all light flashes would be identical. However, in accordance with the invention, the slots of each shutter are of various effective sizes, arranged in a definite pattern or sequence, the sequences being different for the two shutters. The overall sequence of the transmitted light flashes is then a result of the interaction of the two component sequences. Since those sequences are repeated periodically with different periods that are commensurable although one is not a factor of the other, the overall sequence of flashes is also repeated periodically, but with a period longer than that of either of the component periods. The period of repetition of the overall sequence is equal to the least common multiple of the periods of repetition of the component sequences. (It may be noted that the period of repetition of a component sequence may be less than the period of revolution of the shutter that produces it, for example if the slots are arranged in a pattern that repeats more than once each revolution.) In the present instance, the period of repetition of the overall sequence is one second, which is five times the period of rotation of shutter A and twice the period of rotation of shutter B.

Shutter A, as illustratively shown in Fig. 4, has a total of 20 apertures, uniformly distributed circumferentially of the shutter disk. Therefore, if the shutter revolves at 5 revolutions per second, shutter operation occurs every 1/100 sec. Two diametrically opposite apertures, $b$ and $c$, are wider than the rest, all of which are of the same type, $a$. Aperture $c$ is larger than $b$. Shutter B has 50 uniformly distributed apertures, which are of uniform type $d$ except that every tenth aperture is wider. Of those five, four are of uniform type $e$, and one, $f$, is wider than type $e$. Since shutter B revolves at 2/5 the speed of A, the period of shutter operation of B is the same as that of A, or 1/100 sec. in the present instance.

The relative rotational positions of the two shutters is so adjusted that they are operated substantially simultaneously, and an operation of type $a$ of shutter A always accompanies an operation of type $d$ of shutter B. Hence those shutter operations, which occur in series of nine each, produce uniform light flashes and require no further detailed consideration. For clarity of description, the shutter apertures $a$ and $d$ are disregarded in the following discussion, and also in Figs. 6 to 8, to be described.

Shutter B operations of type $e$ are accompanied alternately by shutter A operations of types $b$ and $c$. The same is true of shutter B operations of type $f$. The resulting overall sequence of actual light transmission depends primarily upon the relation between the degree of operation of shutter A produced by aperture $b$ and the degree of operation of shutter B produced by apertures $e$. Fig 4 represents (qualitatively and not necessarily to accurate scale) the particular situation when those two degrees of shutter operation are equal. That requires that the respective widths of slot $b$ in shutter A and of slots $e$ in shutter B be directly proportional to the speeds of the respective shutter disks. Such equivalence of slots $b$ and $e$ is obtained in the present instance by making the angular width of slots $b$ greater than that of slots $e$ in the ratio of 5:2, which is the ratio of speeds of the respective shutters. The "effective width" of the slots is then equal.

Under that condition, it is immaterial, so far as the resulting light flash is concerned, whether a shutter A operation of type $b$ is accompanied by a shutter B operation of type $e$ or of type $f$, since shutter A may be said to control, its slot $b$ being effectively smaller than slot $f$ and equal to slots $e$ of shutter B; and it is also immaterial whether a shutter B operation of type $e$ is accompanied by a shutter A operation of type $b$ or of type $c$, since shutter B may be said to control its slots $e$ being effectively smaller than slot $c$ and equal to slot $b$ of shutter A. All such operations lead to substantially the same type of light flash. Only when a shutter A operation of type $c$ coincides with a shutter B operation of type $f$ is the resulting light flash appreciably longer, and that occurs only once during every two revolutions of shutter disk B. Hence, in the present instance, such a long flash occurs once each second. The invention thus provides a convenient indication of whole seconds in spite of the fact that the longest individual shutter period is only half a second.

The overall sequence of action for the shutters represented in Fig. 4 will be clear from Fig. 6, which includes separate diagrams of potential light transmission (or degree of shutter operation) as a function of time during one complete shutter cycle for shutter A alone and for shutter B alone, and a diagram of the actual transmission that results from the combined effect of shutters $A+B$. It will be noted that the diagram includes five full cycles of the periodic sequence of shutter A and two cycles of the periodic sequence of shutter B. For clarity of illustration the most rapid light flashes, produced at intervals of 1/100 sec. by coincidence of a slot of type $a$ in shutter A and a slot of type $d$ in shutter B, are omitted in Fig. 6. Nine such flashes actually occur at uniformly spaced time intervals between each two flashes shown in Fig. 6.

In the various sequences of Fig. 6, the length of each line represents diagrammatically the approximate relative duration of the corresponding shutter operation, which depends, as already explained, upon the ratio of the angular width of the particular type of shutter slot to the angular speed of rotation of its shutter disk. In sequences A and B, a lower case letter above each line indicates the type of slot in Fig. 4 to which that line corresponds. In the overall sequence, denoted $A+B$ in Fig. 6, the duration of each flash is effectively limited in general either by the action of shutter A or of shutter B, and the diagram lines are marked accordingly. The designation AB indicates that it is immaterial which shutter is controlling. More specifically, in the present instance, slot $b$ in shutter A and slots $e$ in shutter B are equivalent in the sense already defined; and either slot $c$ in shutter A or slot $f$ in shutter B may be made to limit the light flashes resulting from their coincidence, or both slots may correspond to the same flash duration, without appreciably affecting other features of the overall sequence.

An important feature of the overall sequence represented in Fig. 6 is the appearance of all nine intermediate $\frac{1}{10}$ sec. flashes with equal duration. That results primarily from the fact that slot $b$ in shutter A and slots $e$ in shutter B are of such dimensions as to lead to the same flash duration, so that it is immaterial which of those two types of slots effectively controls the overall shutter action.

On the other hand, if slot $b$ is made effectively wider than slots $e$, as represented schematically in Fig. 7, at A and B, then the intermediate $\frac{1}{10}$ sec. flash that is controlled by slot $b$ in shutter A is longer than those controlled by slots $e$ in shutter B. The result is a flash sequence of the type clearly indicated at $A+B$ of Fig. 7.

A further modification of pattern may be obtained by the opposite condition, represented in Fig. 8, in which slots $e$ in shutter B provide a longer period of potential light transmission, that is, a less limited degree of shutter operation, than does slot $b$ in shutter A. Control of the intermediate $\frac{1}{10}$ sec. flashes then alternates between the two shutters, leading to the type of flash sequence indicated at $A+B$ in Fig. 8.

As already indicated, any one light flash, although primarily controlled by an aperture of one shutter, may in general be somewhat affected also by the dimensions of the coinciding aperture in the other shutter. Hence the division between the three illustrative types of sequence shown schematically in Figs. 6–8 may not be absolutely sharp in practice. But one or other type of sequence can be produced in full effect by appropriate relative dimensioning of the shutter apertures.

With the shutter arrangement of Fig. 4, coincidences of slots of type $a$ in shutter A and of type $d$ in shutter B (as in the drawing) lead to a series of nine intermediate $\frac{1}{100}$ sec. light flashes all of the same duration between each two adjacent flashes shown in Figs. 6–8. If it is desired to differentiate among those nine flashes of each series according to some definite sequence, for example by emphasizing the central flash of each series, the appropriate differentiation of slot dimensions can be introduced in each of the two series of slots $a$ in shutter A and in each of the five series of slots $d$ in shutter B. Since the period of repetition ($\frac{1}{10}$ sec.) of such a sequence of $\frac{1}{100}$ sec. flashes is the same as the period of repetition of the sequence of $\frac{1}{100}$ sec. slots in each shutter, the cooperation of the two shutters is not necessary for producing that type of flash sequence. Such cooperation offers certain advantages, such as providing sharper definition of the individual flashes, particularly if the two shutter disks move across the light beam in opposite directions (see Fig. 5). When such action is not required, the structure of Fig. 4 can be somewhat simplified. For example, slots such as $a$ in shutter A may be depended upon entirely for defining the $\frac{1}{100}$ sec. flashes (whether or not differentiation is required among the nine flashes of each series), and shutter B may be modified in the manner indicated in Fig. 4A, where each series of nine slots $d$ of Fig. 4 is replaced by a single clearance aperture $g$. The clearance apertures $g$ insure that shutter B will be open whenever a slot of type $a$ in shutter A passes across light beam axis 100. The action of slots $e$ and $f$ in Fig. 4A is the same as has been described for Fig. 4. The modification just described is representative of the many types of detailed shutter operation that can be introduced without departing from the spirit of the invention.

It will be understood that shutter action in some ways equivalent to that described can be obtained by differentiation of slot length, rather than of slot width as in Fig. 4. For example, the line lengths in Figs. 6–8 may be considered to represent slot length rather than effective slot width. The various light flashes are then characterized primarily by the length of the portion of lamp filament 56 that is effectively exposed by the shutter. The intensities of the successive flashes may thus be varied according to a predetermined sequence, while maintaining the duration of all flashes substantially uniform. Or the variation may be partly in flash length and partly in flash duration. When differentiation is entirely in terms of transmitted intensity, the recording medium 10 is preferably of a type capable of reproducing such differences of intensity. Since the latitude of such photographic media is limited, it may be desirable, particularly if a wide range of recording speeds is to be used, to provide means, such as a rheostat in the lamp circuit, for controlling the lamp brightness in accordance with the selected record speed.

Whereas it is generally preferred to provide timing lines on the record strip that extend substantially the entire width of the strip, it may under certain conditions be desirable to limit the time marks to a relatively narrow area, for example along one edge of the record. That is preferably done by focusing the timing light beam in both coordinates. For example, numeral 42 in Fig. 1 may represent a cylindrical mirror having its cylindrical axis in the plane of the paper and of such curvature as to focus filament 56 (or the shutter apertures) substantially at recording station 12. The timing light beam then forms a generally rectangular image extending across the record strip, the length of that image (normal to the plane of Fig. 1) corresponding to an enlarged image of the filament (or slot) length, formed by cylindrical mirror 42, and the width of the image (longitudinally of the record strip) corresponding to a reduced image of the filament width, formed by cylindrical lens 36. With an optical system of that general type, differences in length of the various shutter slots result in corresponding differences in length of the timing lines on the record. Hence, under those conditions, the diagrams indicated at $A+B$ in Figs. 6–8 may represent directly the appearance of the finished time record.

An illustrative example of shutter apertures differentiated by their length, and hence well adapted for use with a fully focusing optical system as just described, is shown in Fig. 5. In that embodiment, shutter A', represented by disk 171, carries three slots, of which one ($c'$) is longer than the others ($b'$). Shutter B', represented by disk 181, carries four slots, one ($f'$) of which is longer than the others ($e'$). The short slots $e'$ of shutter B', as illustrated, are shorter than those $b'$ of shutter A'. The two shutters are driven in such timed relation that light transmitting apertures of both shutters pass through light transmitting position simultaneously. For example, an external gear 172, driven in any suitable manner, may engage gear teeth cut in the peripheries of both shutter disks, the pitch diameters of those teeth being directly proportional to the numbers of corresponding shutter apertures in the two shutters.

As shutter A' rotates, the relative slot positions produce shutter operation three times during each revolution, while the degree of shutter operation is controlled by the relative slot dimensions. Thus slot c' provides a less limited degree of shutter operation than does a slot of type b'. Successive shutter operations are thus limited in degree in accordance with a sequence that is periodically repeated every revolution of the shutter, for example every ¼ second.

Similarly successive shutter operations of shutter B' are produced four times per revolution by the arrangement of the shutter slots, and the successive degrees of shutter operation are controlled by the shutter slot dimensions in accordance with a sequence that repeats periodically once every revolution, or typically every ⅓ second. The periods of repetition of shutters A' and B' thus include respectively 3 and 4 shutter operations, and are in the ratio 3:4. The overall sequence of the flashes produced by two such shutters acting together has a repetition period equal to the least common multiple of the periods of repetition of the component schedules of the separate shutters, and includes 12 shutter operations. At the speeds of operation suggested above, the overall sequence repeats every second, successive light flashes occuring every 1/12 second.

Figs. 9, 10 and 11 are diagrams corresponding respectively to Figs. 6, 7 and 8, but representing the type of sequence typified in Fig. 5. (Primes are omitted in Figs. 9-11 for clarity.) The action of Fig. 5, in which slots e' are shorter than slots b', is most closely represented by Fig. 10. The sequence marked A+B in Fig. 10 corresponds directly to the appearance of the resulting time lines if the timing beam optical system is arranged to focus the beam in both coordinates, as described, the line lengths being determined by the various slot lengths of the shutter. Fig. 10 may alternatively be considered to represent diagrammatically the relative intensities of successive time lines, if focusing in a plane transverse of the record strip is omitted. Figs. 9 and 11 illustrate the variety of overall sequences that can be produced with the same slot positions shown in Fig. 5, by providing the various indicated relations among the different degrees of shutter operation of the two shutters.

The number of shutters need not be limited to two, as in the examples described above. Any number of shutters may be used. However, the utility of any number of shutters for the primary purposes of the present invention depends upon their having respective periods of repetition of their component sequences that are different multiples of the period of the light flashes to be controlled, and the respective periods of repetition are preferably such that one is not divisible by another. Under those conditions the period of repetition of the overall sequence of flash modulation is the product of the component periods. By utilizing several shutters, it is thus possible to obtain an overall sequence having a very long period of repetition relative to that of any one shutter.

For example, by combination of the two shutters shown in Fig. 5 with a shutter having five apertures of suitable sizes, driven at ⅗ the speed of shutter A', the period of repetition of the overall sequence of flash modulation may be made to include 60 flashes. Such a shutter combination is particularly useful for marking seconds on a time record, since the complete sequence then has a period of one minute. Subdivisions of seconds can readily be included. For example, tenths of seconds can be indicated in the manner described for 1/100 sec. flashes in connection with Figs. 4 and 4A.

I claim:

1. Means for producing a periodic series of light flashes in a light beam, comprising in combination a plurality of rotatable shutters arranged in the path of the light beam, each shutter being provided with a plurality of apertures uniformly spaced circumferentially of the shutter and adapted to transmit light in the beam intermittently as the shutter rotates, the respective shutters having different numbers of apertures, which numbers are integrally indivisible one by the other and the apertures of each said shutter including at least two different aperture sizes, and means for rotating the said shutters at speeds inversely proportional to their respective numbers of said apertures in such mutual timed relation that whenever an aperture of one shutter passes through light transmitting position an aperture of each other shutter does so also, whereby is produced an ordered sequence of light flashes of a plurality of different values of effective light flux, the period of repetition of the ordered sequence being a different integral multiple of the period of revolution of each shutter.

2. Means for producing a periodic series of light flashes in a light beam, comprising in combination a pair of rotatable shutters arranged in the path of the light beam, one of the said shutters being provided with five apertures uniformly spaced circumferentially of the shutter, four of the said apertures being of equal size and smaller than the fifth, and the second shutter being provided with two apertures of different size diametrically oppositely disposed, the said apertures being adapted to transmit light in the beam intermittently as the shutters rotate, and means for rotating the first and second mentioned shutters at respective speeds having a ratio of 2 to 5, and in such mutual timed relation that whenever an aperture of one shutter passes through light transmitting position an aperture of the other shutter does so also, whereby is produced an ordered sequence of light flashes of a plurality of different values of effective light flux, the period of repetition of the ordered sequence being twice the period of revolution of the said one shutter and being five times the period of revolution of the said second shutter.

3. Means for producing a periodic series of light flashes in a light beam, comprising in combination a pair of rotatable shutters arranged in the path of the light beam, one of the said shutters being provided with five apertures uniformly spaced circumferentially of the shutter, four of the said apertures being of equal size and smaller than the fifth, and the second shutter being provided with two apertures of different size diametrically oppositely disposed, the said apertures being adapted to transmit light in the beam intermittently as the shutters rotate, the said four apertures in the first mentioned shutter having an angular width effective for light transmission approximately ⅔ that of the smaller said aperture in the second mentioned shutter, and means for rotating the first and second mentioned shutters at respective speeds having a ratio of 2 to 5, and in such mutual timed relation that whenever an aperture of one shutter passes through light transmitting position an aperture of the other shutter does so also, whereby is produced an ordered sequence of ten light flashes, the values of the effective light flux of nine of the flashes being substantially the same and smaller than that of the tenth flash, and the period of repetition of the ordered sequence being twice the period of revolution of the said one shutter and five times the period of revolution of the said second shutter.

4. Means for producing a periodic series of light flashes in a light beam, comprising two circular overlapping beam intercepting shutters journaled on opposite sides of the light beam on axes substantially coplanar with the axis of the light beam and parallel thereto, a plurality of light transmitting apertures uniformly spaced circumferentially of each shutter, one shutter having fewer of said apertures than the other, a gear mounted coaxially on the said one shutter and engaging gear teeth cut in the periphery of the other shutter radially outwardly of its said apertures, the numbers of teeth on the gear and on the shutter being proportional respectively to the numbers of said apertures in the first and second mentioned shutters, the said gear teeth being engaged in such phase relation that whenever an aperture of one shutter passes through light transmitting position an aperture of the other shutter does so also.

WILLIAM W. MILLER.

References Cited in the file of this patent

UNITED STATES PATENTS

| Number | Name | Date |
|---|---|---|
| 1,454,899 | Legg | May 15, 1923 |
| 1,810,188 | Smith | June 16, 1931 |
| 2,045,260 | Berggren | June 23, 1936 |
| 2,052,960 | Berggren | Sept. 1, 1936 |
| 2,105,470 | Bower | Jan. 18, 1938 |
| 2,265,149 | Crane et al. | Dec. 9, 1941 |
| 2,268,133 | Carlson | Dec. 30, 1941 |
| 2,383,381 | Hammond | Aug. 21, 1945 |

FOREIGN PATENTS

| Number | Country | Date |
|---|---|---|
| 552,545 | France | May 22, 1923 |